(12) United States Patent
Tirosh et al.

(10) Patent No.: US 12,523,488 B2
(45) Date of Patent: Jan. 13, 2026

(54) HANDS-FREE PEDESTRIAN NAVIGATION SYSTEM AND METHOD

(71) Applicant: Veeride Geo Ltd., Rehovot (IL)

(72) Inventors: Ehud Tirosh, Mevaseret Zion (IL); Zvi Lapidot, Rehovot (IL); Shmuel Friedman, Ness Ziona (IL)

(73) Assignee: Veeride Geo Ltd., Rehovot (IL)

( * ) Notice: Subject to any disclaimer, the term of this patent is extended or adjusted under 35 U.S.C. 154(b) by 48 days.

(21) Appl. No.: 17/492,906

(22) Filed: Oct. 4, 2021

(65) Prior Publication Data
US 2022/0107202 A1 Apr. 7, 2022

(30) Foreign Application Priority Data
Oct. 7, 2020 (GB) ...................................... 2015887

(51) Int. Cl.
*G01C 21/36* (2006.01)
*G01C 21/16* (2006.01)
(Continued)

(52) U.S. Cl.
CPC .......... *G01C 21/3664* (2013.01); *G01C 21/16* (2013.01); *G01C 21/3608* (2013.01);
(Continued)

(58) Field of Classification Search
CPC ................ G01C 21/3664; G01C 21/16; G01C 21/3608; G01C 21/3629; G01C 21/3644;
(Continued)

(56) References Cited

U.S. PATENT DOCUMENTS 10,012,506 B1 7/2018 Monahan
2003/0018430 A1 1/2003 Ladetto
(Continued)

FOREIGN PATENT DOCUMENTS

CN 103591958 2/2014
CN 106575151 4/2017
(Continued)

OTHER PUBLICATIONS

Nehla Ghouaiel, Jean-Marc Cieutat, Jean Pierre Jessel. Haptic System for Eyes Free and Hands Free Pedestrian Navigation. ACHI 2013: The Sixth International Confer¬ence on Advances in Computer-Human Interactions, Feb. 2013, France pp. 330-335.
(Continued)

*Primary Examiner* — Christian Chace
*Assistant Examiner* — Katherine Marie Fitzharris
(74) *Attorney, Agent, or Firm* — Niels Haun; Dann, Dorfman, Herrell & Skillman, P.C.

(57) ABSTRACT

A hands-free pedestrian navigation method includes mounting on a user's head (i) a display for projecting a visual image in front of the user's gaze, and (ii) an IMU, obtaining from a GPS unit carried by the user an approximate user location for locating the user in a computerized map. Confirmation is obtained from the user that the user's gaze is directed to a specified landmark in sight of the user and azimuth is computed between the user location and the landmark location extracted from the computerized map. Vocal prompts are provided and ancillary visual prompts are projected on the display to navigate the pedestrian. In a system, the user wears a head-mounted device containing the IMU and display and carries a GPS unit and a portable computing device coupled to the device and GPS unit and programmed to carry out the method.

20 Claims, 9 Drawing Sheets

(51) Int. Cl.
*G02B 27/00* (2006.01)
*G02B 27/01* (2006.01)
*G06F 3/01* (2006.01)

(52) U.S. Cl.
CPC ..... *G01C 21/3629* (2013.01); *G01C 21/3644* (2013.01); *G01C 21/365* (2013.01); *G02B 27/0093* (2013.01); *G02B 27/0172* (2013.01); *G02B 27/0176* (2013.01); *G06F 3/013* (2013.01)

(58) Field of Classification Search
CPC .... G01C 21/365; G01C 17/38; G01C 21/165; G01C 21/20; G01C 21/1656; G01C 21/183; G02B 27/0093; G02B 27/0172; G02B 27/0176; G06F 3/013; G06F 1/163; G02C 7/086; G02C 11/10; G01S 19/13
See application file for complete search history.

(56) References Cited

U.S. PATENT DOCUMENTS

| | | | |
|---|---|---|---|
| 2006/0146518 A1* | 7/2006 | Dubin | G02F 1/133524 362/561 |
| 2009/0295596 A1* | 12/2009 | Downey | G04G 21/04 340/850 |
| 2012/0050144 A1* | 3/2012 | Morlock | G06T 19/006 345/8 |
| 2013/0322667 A1 | 12/2013 | Christensen | |
| 2015/0354951 A1 | 12/2015 | Ali | |
| 2015/0379360 A1 | 12/2015 | Rhee | |
| 2016/0063762 A1 | 3/2016 | Heuvel | |
| 2016/0086332 A1* | 3/2016 | Chen | G06T 15/40 345/419 |
| 2016/0189426 A1 | 6/2016 | Thomas | |
| 2016/0224855 A1 | 8/2016 | Al-Hamad | |
| 2018/0120122 A1 | 5/2018 | Laine | |
| 2018/0135986 A1* | 5/2018 | Dayal | G06Q 30/0639 |
| 2019/0332400 A1* | 10/2019 | Spoor | G06F 3/013 |
| 2020/0058169 A1* | 2/2020 | Friesenhahn | G06T 17/05 |
| 2020/0195833 A1 | 6/2020 | Sivan | |
| 2020/0341529 A1* | 10/2020 | Kaipu Narahari | G05B 15/02 |

FOREIGN PATENT DOCUMENTS

| | | |
|---|---|---|
| CN | 106595653 | 4/2017 |
| CN | 106840148 | 6/2017 |
| EP | 2128724 | 12/2009 |
| JP | 2011220899 | 11/2011 |
| JP | 2017015485 | 1/2017 |
| JP | 2022527871 | 6/2022 |
| WO | 2019215739 | 11/2019 |
| WO | 2020167346 | 8/2020 |

OTHER PUBLICATIONS

McGookin, D., Brewster, S., & Priego, P. (2009). Audio Bubbles: Employing Non-speech Audio to Support Tourist Wayfinding. In M. Ercan Altinsoy, U. Jekosch, & S. Brewster (Eds.), Haptic and Audio Interaction Design: 4th International Conference, HAID 2009 Dresden, Germany, Sep. 10-11, 2009 Proceedings (vol. 5763, pp. 41-50).

Ioannis Giannopoulos et al. GazeNav: Gaze-Based Pedestrian Navigation, Mob ileHCI '15, Aug. 25-29, 2015, Copenhagen, Denmark.

Michael Minock et al. A Test-Bed for Text-to-Speech-Based Pedestrian Navigation Systems.

Johan Boye et al. Walk This Way: Spatial Grounding for City Exploration J. Mariani et al. (eds.), Natural Interaction with Robots, Knowbots and Smartphones: Putting Spoken Dialog Systems into Practice, DOI 10.1007/978-1-4614-8280-2 6, © Springer Science+Business Media New York 2014.

D.W.F. van Krevelen and R. Poelman A Survey of Augmented Reality Technologies, Applications and Limitations in The International Journal of Virtual Reality, 2010, 9(2):1-20.

Bartie P. Mackaness W, Lemon O, Dalmas T, Janarthanam S, Hill R, Dickinson A & Liu X (2018) A dialogue based mobile virtual assistant for tourists: The SpaceBook Project, Computers, Environment and Urban Systems, 67, pp. 110-123.

Gabriel Skantze Error Handling in Spoken Dialogue Systems PHD Thesis, Stockholm, Sweden 2007.

Ricky Jacob, PHD Thesis "Integrating Haptic Feedback into Mobile Location Based Services" Department of Computer Science National University of Ireland Maynooth, Jul. 2013.

Martin Veskrna of Masaryk University, Faculty of Informatics dated 2013, entitled: "Positioning system for small devices using principles of inertial navigation system".

Xiaoping Yun et al. published 2007 IEEE International Conference on Robotics and Automation (Rome, Italy, Apr. 10-14, 2007) entitled: "Self-Contained Position Tracking of Human Movement Using Small Inertial/Magnetic Sensor Module".

Japan Office Action dated Sep. 22, 2025 in Counterpart Application No. 2021-161778 with machine translation.

China Office Action dated Sep. 17, 2025 in Counterpart Application No. 202111170346.2 with machine translation.

* cited by examiner

HANDS-FREE PEDESTRIAN NAVIGATION SYSTEM AND METHOD

RELATED APPLICATION

This application claims benefit of priority of GB Application No. 2015887.9 filed on Oct. 7, 2020, the entire contents of which application is incorporated herein by reference.

FIELD OF THE INVENTION

This invention relates to pedestrian navigation systems. In some embodiments it relates to calibration of a magnetometer in an inertial magnetic unit (IMU) in order to ensure that a pedestrian's direction of motion conforms to a desired destination.

PRIOR ART

Prior art references considered to be relevant as a background to the invention are listed below and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] Nehla Ghouaiel, Jean-Marc Cieutat, Jean Pierre Jesse. *Haptic System for Eyes Free and Hands Free Pedestrian Navigation*. ACHI 2013: The Sixth International Conference on Advances in Computer-Human Interactions, February 2013, France pp. 330-335 <hal-00908028>

[2] McGookin, D., Brewster, S., & Priego, P. (2009). *Audio Bubbles: Employing Non-speech Audio to Support Tourist Wayfinding*. In M. Ercan Altinsoy, U. Jekosch, & S. Brewster (Eds.), Haptic and Audio Interaction Design: 4th International Conference, HAID 2009 Dresden, Germany, Sep. 10-11, 2009 Proceedings (Vol. 5763, pp. 41-50). Springer. https://doi.org/10.1007/978-3-642-04076-4_5

[3] Ioannis Giannopoulos et al. *GazeNav: Gaze-Based Pedestrian Navigation*, Mob ileHCI '15, Aug. 25-29, 2015, Copenhagen, Denmark

[4] Michael Minock et al. *A Test-Bed for Text-to-Speech-Based Pedestrian Navigation Systems*

[5] Johan Boye et al. *Walk This Way: Spatial Grounding for City Exploration* J. Mariani et al. (eds.), Natural Interaction with Robots, Knowbots and Smartphones: Putting Spoken Dialog Systems into Practice, DOI 10.1007/978-1-4614-8280-2 6, © Springer Science+Business Media New York 2014

[6] D. W. F. van Krevelen and R. Poelman *A Survey of Augmented Reality Technologies, Applications and Limitations* in The International Journal of Virtual Reality, 2010, 9(2):1-20

[7] Bartie P, Mackaness W, Lemon O, Dalmas T, Janarthanam S, Hill R, Dickinson A & Liu X (2018) *A dialogue based mobile virtual assistant for tourists: The SpaceBook Project*, Computers, Environment and Urban Systems, 67, pp. 110-123.

[8] Gabriel Skantze *Error Handling in Spoken Dialogue Systems* PhD Thesis, Stockholm, Sweden 2007

[9] Ricky Jacob, PhD Thesis "*Integrating Haptic Feedback into Mobile Location Based Services*" Department of Computer Science National University of Ireland Maynooth, July 2013

BACKGROUND OF THE INVENTION

The proliferation of the smartphone has spawned many and varied personal or pedestrian navigation systems that exploit the ubiquity of the smartphone and of its standard in-built GPS. Typical systems are hand-held, meaning that the user must hold them manually, very often to read a map of his or her immediate vicinity which is downloaded based on the GPS coordinates of the user's smartphone.

The need to hold a smartphone in one's hands and to look down at the screen or raise the screen to one's line of sight imposes an unwelcome restriction on such an approach since it is disruptive. For example, a tourist walking through the streets of a foreign city is preoccupied with looking at the sights. If the tourist needs directions to reach a particular tourist sight and is thus constrained to divert his gaze to the screen of his smartphone this is an intrusion. It also requires the tourist to hand-hold his smartphone, which may also be undesirable.

The recognition of this inconvenience has led to so-called hands-free navigation systems.

Ghouaiel et al. [1] discloses a hands-free navigation system that uses vibrating elements and Augmented Reality in a haptic modality to guide pedestrians in an urban environment via hands free and eyes free navigation.

McGookin et al. [2] introduces the concept of Audio Bubbles-virtual spheres filled with audio that are geocentered on physical landmarks, providing navigational homing information for a user to more easily locate the landmark.

Giannopoulos et al. [3] discloses the use of head mounted eye trackers to provide gaze-based interaction for pedestrian navigation providing navigation information if the street the user is looking at is the one to be followed.

Minock et al. [4] presents an Android system to support eyes-free, hands-free navigation through a city. In one mode, a human operator sends text messages which are realized via TTS into a user's earpiece. The operator sees the subject's GPS position on a map, hears the subject's speech, and sees a 1 fps movie taken from the subject's phone, worn as a necklace.

Boye et al. [5] describes a spoken-dialogue prototype for pedestrian navigation in Stockholm that addresses the problem of noise in GPS readings by using various grounding strategies. This relates to the need before giving directions for the navigation system to first ground the user's current position and orientation by means of reference landmarks in the near vicinity.

The discussion of grounding in this paper is relevant to the present invention since it addresses a similar problem to which the invention relates. But the proposed solution is quite different. Specifically, Boye et al. [5] uses landmarks to guide the user to an initial node in a map and then monitors in real time progress of the user toward the designated node. As long as the distance to the next node is decreasing everything is fine. If the distance to the next node starts increasing, the system checks the distance to a successive node B as well to determine whether the user has passed the expected node A and is continuing in the correct direction. But if it is determined that distance is increasing both to the expected next node A and to the expected successive node B and this pattern persists for 10 s, the system assumes that the user is walking in the wrong direction and will issue re-planning.

What this means is that while Boye et al. [5] are attuned to the problem of correctly directing a mobile user to a designated destination and of the shortcomings of GPS for precisely locating the user's position, they use a trial and error approach to correcting for directional errors. In other words, their approach allows for the fact that landmark-based guidance may result in the pedestrian walking away from the desired destination, but they detect errors and then take suitable remedial action.

Krevelen et al. [6] provides a detailed overview of AR techniques including discussion for head tracking. They note that inertial navigation systems employ accelero-meters and gyroscopes for which timed measurements can provide a practical dead-reckoning method to estimate position when combined with accurate heading information. The estimates must periodically be updated with accurate measurements to minimize errors due to drift. They also review tracking in unprepared environments and acknowledge that calibration of these devices remains problematical.

Bartie et al. [7] likewise provides a thorough overview of pedestrian navigation systems including Augmented Reality (AR) applications, which typically employ a head-mounted camera to image a scene in the user's line of sight and transmit the image via the user's smartphone to a navigation server. A problem with such an approach is that relatively high bandwidth is required to transmit the digital image and this drains the battery of the smartphone. This paper also discusses the need to clarify which direction to start walking when the Global Navigation Satellite System (GNSS) direction value is not trustworthy as GNSS can only calculate orientation from movement history. They note that the smartphone magnetometer could not be utilized because the phone was not held flat, but was instead in the user's pocket or bag, resulting in a very noisy output.

The solution proposed by [7] to orientating the user is to refer to well-known nearby landmarks and ask the user to keep those on their right or left as they set off (e.g. "keep Blackwell's Bookshop on your right"). This ensures the user does not have to back track once the GNSS is able to derive a good direction heading from the trajectory history.

Bartie et al. [7] also relates to the need to customize the name selection based on the user's approach angle so that the system's reference to a building matched the user's view. This is done by linking given occupant street address information to the road network, such that each occupant point is assigned a direction.

Skantze [8] also provides background to many of the problems relating to pedestrian navigation and grounding. In § 6.1 he describes the Higgins Spoken Dialogue System used in a simulated 3D model of a virtual city to guide a pedestrian using verbal dialogue. The system does not have access to the user's position by any positioning device. Instead, it has to figure out the position by engaging in a dialogue in which the user describes the surroundings. But the author acknowledges that this is not feasible in real city because it would be infeasible to model the city completely and because a real application would utilize a GPS.

US2003/018430 discloses a pedestrian navigation method and apparatus operative in a dead reckoning mode using standard miniaturized inertial navigation system (INS) modules as a source of accelerometric signals. FIG. 12K is a flow chart showing an algorithm for automatic detection and correction of a magnetic disturbance of a digital magnetic compass based on comparison of azimuth of displacement provided by the digital magnetic compass and/or one or more gyroscopes which are initially aligned with the compass output.

US2015/0354951 discloses a method and apparatus for determining misalignment between a device and a pedestrian holding or wearing the device in different orientations in a constrained or unconstrained manner. The device may be head mounted such as smart glasses, smart goggles, ear mounted systems, system on helmet. One embodiment provides pedestrian dead-reckoning for correcting misalignment between device heading and pedestrian heading.

US2013/0322667 discloses a personal navigation system including a head mounted hearing device having speakers for emission of sound towards ears of a user, the hearing device accommodating an inertial magnetic unit for determining head yaw of the user, when the user wears the hearing device in its intended operational position on the user's head. The system includes a GPS unit for determining a geographical position of the user, a sound generator connected for outputting audio signals to the speakers, and a pair of filters with a Head-Related Transfer Function connected in parallel between the sound generator and the speakers for generation of a binaural acoustic sound signal, wherein the speakers are configured to emit the sound towards the ears of the user so that the sound is perceived by the user as coming from a sound source positioned in a direction corresponding to the Head-Related Transfer Function.

US20120050144 discloses a wearable head mounted augmented reality computing apparatus that may include a magnetometer or a gyroscope for determining direction. The suite of sensors that make up the INS needs to be mounted on the head of the user so that it can be used to accurately determine the orientation of the field of view. The apparatus may be used in routing/navigation for pedestrians. To this end, a display (shown as part of a smartphone) and a reflective device are attached to a harness worn on the head and configured such that displayed information is viewable superimposed on reality. A microphone and earphones may be attached to the harness for provision of verbal commands and audio output although no suggestion is made to integrate such features to aid in navigation. Indeed, although a suggested application of the apparatus is for navigation, no description is provided as to how the apparatus may be used to such end, the description being limited to provision of a head-mounted see-through display that may use a smartphone having sensors that allow determination of the user's direction of gaze. Such an apparatus is cumbersome, requires a custom harness for supporting the smartphone and, perhaps most significantly, makes the smartphone inaccessible for regular use.

US20200195833 discloses a system comprising two wearable devices associated with right and left sides of the user body, each comprising an RF beacon. Head pose or gaze detection is estimated by comparing signal strength (such as RSSI) or phase of the RF signals from the wearable devices at the digital camera device. Angular deviation between gaze detection and the camera (such as the line of sight) is estimated, and the camera is activated or controlled based on comparing the angular deviation to a set threshold.

Use of IMU for human motion or positioning is described in a Master's Thesis by Martin Veskrna of Masaryk University, Faculty of Informatics dated 2013, entitled: *"Positioning system for small devices using principles of inertial navigation system"*, and in a paper by Xiaoping Yun et al. published 2007 IEEE International Conference on Robotics and Automation (Rome, Italy, 10-14 Apr. 2007) entitled: *"Self-Contained Position Tracking of Human Movement Using Small Inertial/Magnetic Sensor Module"*.

Both of these papers relate to pedestrian navigation and to the need to calibrate the inertial navigation system in order to correct drift of the magnetic sensor. Different techniques are employed. For example, commonly a gyroscope is provided to provide directional signals.

Jacobs [9] provides a detailed survey of then current (2013) approaches for pedestrian navigation and, in reference to mobile based location services (MBLS) observes that the most popular interaction methods used in MLBS is the use of overlays of information on maps for navigation assistance and spatial query responses. Some systems provided textual feedback with turn-by-turn directions while others integrated landmark information and photographs. Researchers have also integrated panoramic images or other geo-tagged images of places along with information overlay to provide feedback to the user. He notes a shift from pure location-based to orientation-aware systems with the availability of low cost on-board digital compasses thereby increasing the popularity of bearing based mobile spatial interaction.

He also refers to the use of augmented reality in mobile spatial interaction systems wherein the location and orientation of the mobile device is used along with the camera of the device to provide spatial information to the user overlaid on real-time images.

US20160224855 uses an optical sensor to estimate heading misalignment between a portable device such as a mobile/smart phone and a person carrying the device. Alignment of the inertial sensors within the platform (e.g., alignment of the portable electronic device containing the inertial sensors with the platform's forward, transversal and vertical axes) is typically required for traditional inertial navigation systems. Where the inertial sensors are not properly aligned, the positions and attitude calculated using measurements from the inertial sensors will not be representative of the state of the platform. As such, in order to achieve high accuracy navigation solutions, inertial sensors must be tethered within the platform.

The above review merely scratches the surface of pedestrian navigation systems and of multiple and varied efforts to provide hands-free systems that provide initialization or calibration of inertial guidance systems or, in some cases, avoid the need to do so. Thus, Bartie et al. [7] avoids the need to so by providing a wholly voice-based navigation system that avoids the need to rely on a smartphone's magnetometer.

Such an approach can be highly disruptive. It may be reassuring to a single tourist in an unfamiliar environment by virtue of its constant and incessant verbal dialogue but it effectively anchors the user's attention to the navigation system. A couple on vacation using such a system will find it difficult to hold a conversation without being constantly interrupted.

Boye et al. [5] also employs a voice-based system where alignment errors are corrected by trial and error.

WO 2019/215739 in the name of the present applicant discloses a detachable spectacles-mounted augmented reality (AR) device and clip-on unit. The device has a housing detachably supporting the clip-on unit, an exit window and an entrance window in the housing through which the user observes a scene, a communications interface for coupling to a hand-held device, and a line-of-sight guide unit operatively coupled to an IMU for displaying at least one marker at the user's field of view for directing a line of sight of the user toward a designated feature in the scene, and optics within the housing projects the marker at a distance for superimposing on to the scene viewed by the user.

U.S. Pat. No. 10,012,506 discloses a navigation guidance system that utilizes an electronic compass to determine a desired linear travel path between two way points and to monitor a direction of travel of a user. If the system determines that the direction of travel is within an established tolerance, it alerts the user through one or more alert indicator components.

US2016/189426 discloses methods for generating virtual proxy objects and controlling the location of the virtual proxy objects within an augmented reality environment are described. A head-mounted display device (HMD) may identify a real-world object for which to generate a virtual proxy object, generate the virtual proxy object corresponding with the real-world object, and display the virtual proxy object using the HMD such that the virtual proxy object is perceived to exist within an augmented reality environment displayed to an end user of the HMD.

SUMMARY OF THE INVENTION

It is an object of the invention to provide a pedestrian navigation system and method that avoid some of the above-described drawbacks.

Specifically, the invention provides a solution to the need for a compact and lightweight accessory that can be clipped on to a user's spectacle frame, having an IMU, a microdisplay, optics, and an audio-interface for allowing a pedestrian to orientate himself to a designated landmark and to receive both verbal guidance to a required destination as well as ancillary guidance in the form of visual markings that are projected on the user's far field of view via the see-through display.

The IMU includes a magnetometer and/or gyros that provide a direction signal in a hands-free navigation system that uses a smartphone having in-built GPS for orientating the user relative to a map and that provides vocal instructions for guiding the user to a requested direction.

The invention also provides a method to correctly orientate the user to the map so that correct navigation commands can be issued to direct the user along the correct path to a desired destination.

The invention may be employed in a navigation system that does not require a camera to provide the initial alignment thus avoiding the increased bandwidth requirements of such systems. It also seeks to avoid correction by trial-and-error since it is frustrating for a pedestrian to walk several hundred meters before realizing that he is walking in the wrong direction and must retrace his steps.

The invention provides a hands-free pedestrian navigation method for assisting a user to reach a destination, the method comprising:
 (a) mounting on the user's head (i) a see-through display for projecting a visual image in front of the user's gaze, and (ii) an IMU;
 (b) obtaining from a GPS unit carried by the user an approximate user location;
 (c) using the approximate user location to locate the user in a computerized map of an area containing the user;
 (d) determining in said area a landmark having a known landmark location within view of the user;
 (e) obtaining confirmation from the user that the user's gaze is directed to the landmark;
 (f) determining a computed azimuth between the user location and the landmark location extracted from the computerized map; and
 (g) navigating the pedestrian by providing vocal prompts and projecting ancillary visual prompts via the see-through display.

Such an approach provides a very lightweight solution to the problem inherent in all navigation systems of establishing not only the user's location but no less importantly her direction of movement. Once this is established, a computerized navigation system can orientate the user on a map and direct her to a requested destination in a manner that is similar to vehicle navigation systems, which give clear vocalized instructions only when the user needs to change direction. So when the pedestrian reaches a junction where she is required to turn right, a vocal instruction can be given to turn right at the next street and continue along Lincoln Avenue for 500 meters. The system will discern that user has followed the instruction based on the measured direction of the IMU and can thus desist from the further instructions until another change in direction is mandated.

Conversely, if the user makes a wrong turn, the system can immediately discern this and alert the user in real time: "No not this road, turn back to the main road, continue for a further 100 meters and then turn right" or the system can recalibrate the route depending on pre-programmed settings in conjunction with whether the recalibrated route is significantly less optimal than the original route. If, in fact, it really makes no difference if the user turns right now or in a further 100 meters, the system can decide to leave it be rather than issue a potentially disruptive verbal alert.

In some embodiments the calibration can be initiated by the navigation system by directing the user to look at a landmark chosen by the system. Alternatively, the user can select a landmark in his field of view and can inform the navigation system verbally that his gaze is directed to the specified landmark. In some embodiments, the IMU is part of a device containing a see-through display that allows the user to project a marker on to a distant object in his field of view. In such case, the user can inform the navigation system verbally that his gaze is directed to a specified landmark allowing for the IMU to be calibrated as explained above.

The device is preferably head mounted and contains the IMU and a communications interface to the user's smartphone, typically a wireless connection such as Bluetooth™ although a wired connection is also feasible since it still allows hand-free navigation. The user hears instructions via the smartphone, although in the interest of privacy and politeness, vocal instructions are relayed to earphones, which can also be coupled to the smartphone via a short range wireless interface or by wires. The user communicates audible instructions via a miniature microphone that can be clipped on to clothing or can be part of the device which is likewise coupled to the smartphone either by wires or wirelessly, but preferably the latter via a Bluetooth™ connection.

In some embodiments, the navigation system is based on voice controlled virtual assistant AI technology such as Amazon Alexa used in conjunction with a compact visual based accessory, such as disclosed in above-mentioned WO 2019/215739. This may be clipped, when needed, on to eyewear frames, such as Echo Frame, or Bose Frame, or any eyewear frame supporting a microphone and earphone, thereby enabling a friendly voice-based dialogue, combined with visual instructions overlaid on reality.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
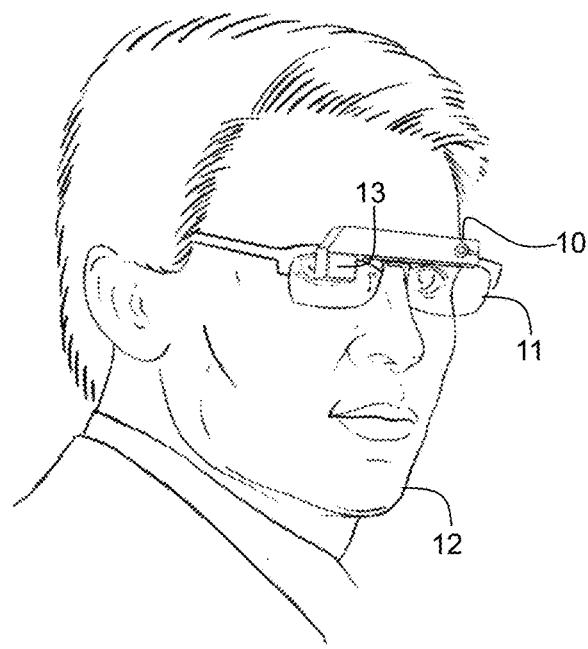
FIG. 1a is a pictorial representation of a user wearing a device according to the invention.

FIG. 1a shows device 10 detachably clip-mounted on to the front of a spectacles frame 11 worn by a user 12. By such means the device 10 is mounted directly in front of the user's eyes, allowing him to observe a scene through an exit window 13. Also, the user can see graphical annotations projected to his eye by the detachable device 10 and overlaid on the real scene. Preferably, the spectacle frame 11 is a so-called "smart frame" supporting a microphone and earphone, but these can be retrofitted to a conventional spectacle frame with additional, separate, microphone and earphone or be mounted discretely as independent accessories. Preferably, the device 10 is an integral accessory configured for attaching to the front of the spectacle frame with none of its components being mounted on the temple pieces (side arms) of the user's spectacles, thus allowing the device to be mounted on a conventional spectacle frame. However, the invention does not preclude the possibility to mount or build some of the components into the side arms of a custom frame.

Figure 1B:
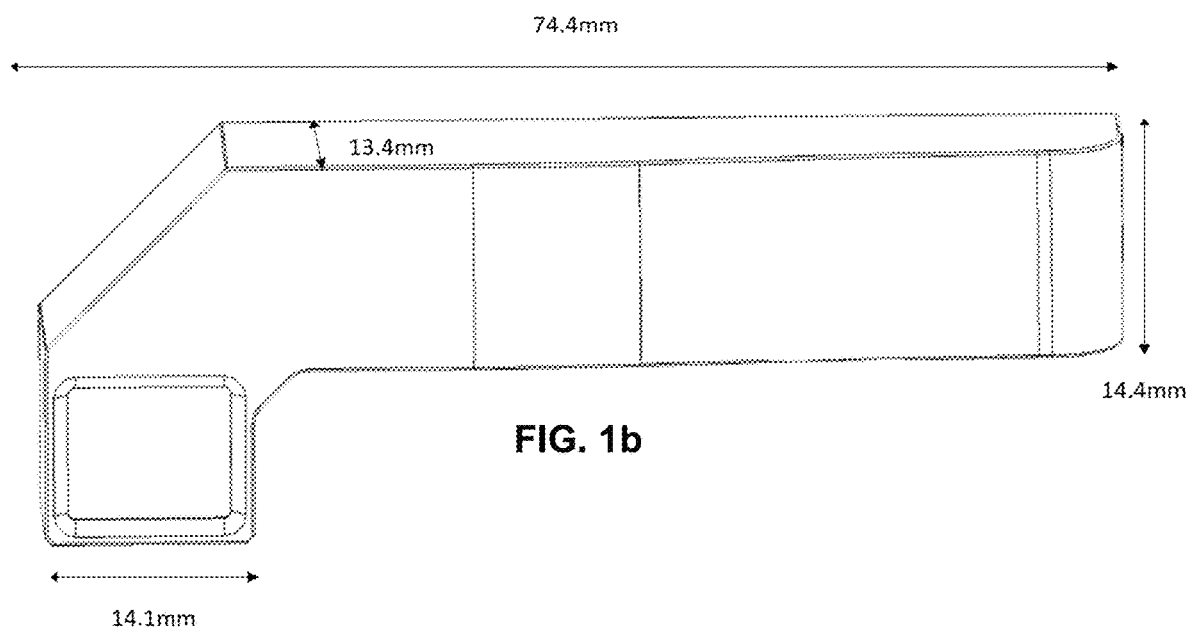
FIG. 1b is a pictorial representation of the device showing typical dimensions.

FIG. 1b shows typical dimensions of the device 10 according to a preferred embodiment whose minimal components are an IMU, a see-through display comprising a micro-display, semi-transparent mirror and optics as described below with reference to FIGS. 2 and 3, and communication means. In order to permit such miniaturization, the FOV of the see-through display is small, and lateral adjustment of the device allows the optical exit window to be moved into alignment with the user's eye. When wireless communication is used, the device includes a small battery. To reduce power consumption, only the most essential components are used or even included. Most significantly a camera is not required and may be omitted, partly in order to reduce size but mainly to avoid excessive power consumption, additional electronics for image compression, high bandwidth communication (such as WiFi) for transmitting the video to the smartphone, all of which add bulk to the device and drains the battery.

Figure 2:
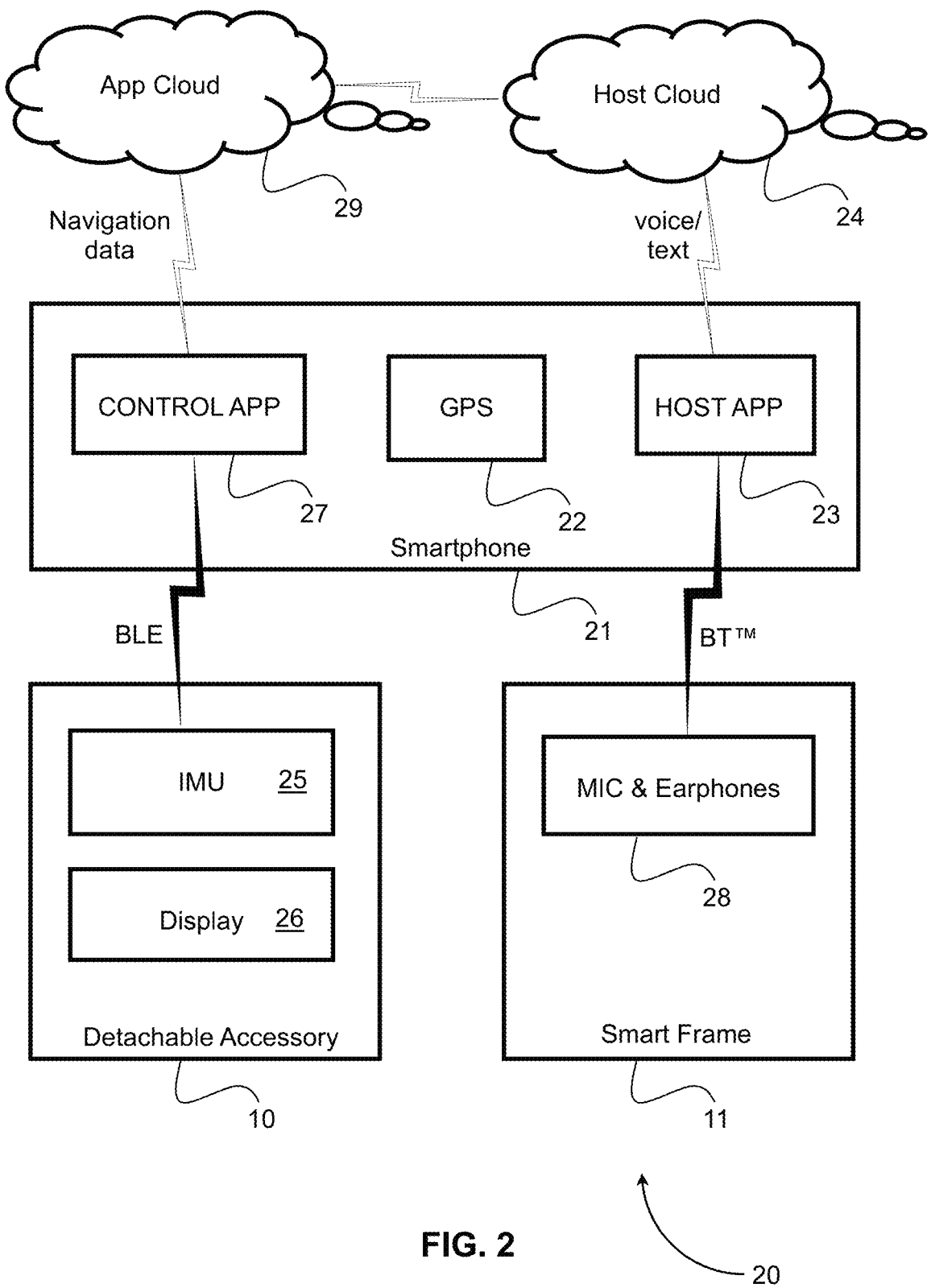
FIG. 2 is a block diagram showing a system according to the invention.

FIG. 2 is a block diagram of a system 20 that integrates a smartphone 21 having a GPS unit 22 and a host smartphone application 23 with a voice-controlled navigation system depicted as a host cloud application 24 and the clip-on device 10. The clip-on device 10 contains an IMU 25 and a micro-display 26 and is connected via BLE (Bluetooth™ Low Energy) to a smartphone control application

27. The smart frame 11 connects via Bluetooth™ to the host smartphone application 23. The smart frame may be the Amazon Echo Frame having a microphone and earphones 28 as integral components and the host cloud application 24 may be the Amazon Alexa and Skills. Such an implementation avoids the need to incorporate the audio components in the device 10 although this option is obviously also possible, albeit at the expense of some additional bulk and increased battery consumption. For ease and consistency of description, we will refer to software applications that are loaded on to the smartphone as smartphone applications, while software applications that are operated over the Internet will be referred to as cloud applications.

The smartphone control application 27 connects to a navigation application cloud 29, in which all navigation tasks are performed and conveyed to and from the control application over the Internet. The host smartphone application 23 connects to the host cloud application 24 via the Internet. In the figure, short-range Bluetooth™ communication is depicted by a black arrow, while Internet communication is depicted by a white arrow. The host smartphone application 23 performs voice/text conversion and interfaces to the navigation application cloud 29 over the Internet. Amazon Sharing Alexa Skills are used to transfer data between the host cloud application 24 and the navigation application cloud 29 to also enable activation of necessary functions, such as navigation, in the navigation application cloud 29. More specifically, Amazon allows device manufacturers to integrate Alexa voice capabilities into their own connected products by using the Alexa Voice Service (AVS), a cloud-based service that provides APIs to interface with Alexa. This requires that communication between the host smartphone application 23 and the smartphone control application 27 be mediated via the clouds 24 and 29. However, other platforms may accommodate direct internal communication between the two smartphone applications 23 and 27.

Figure 3A:
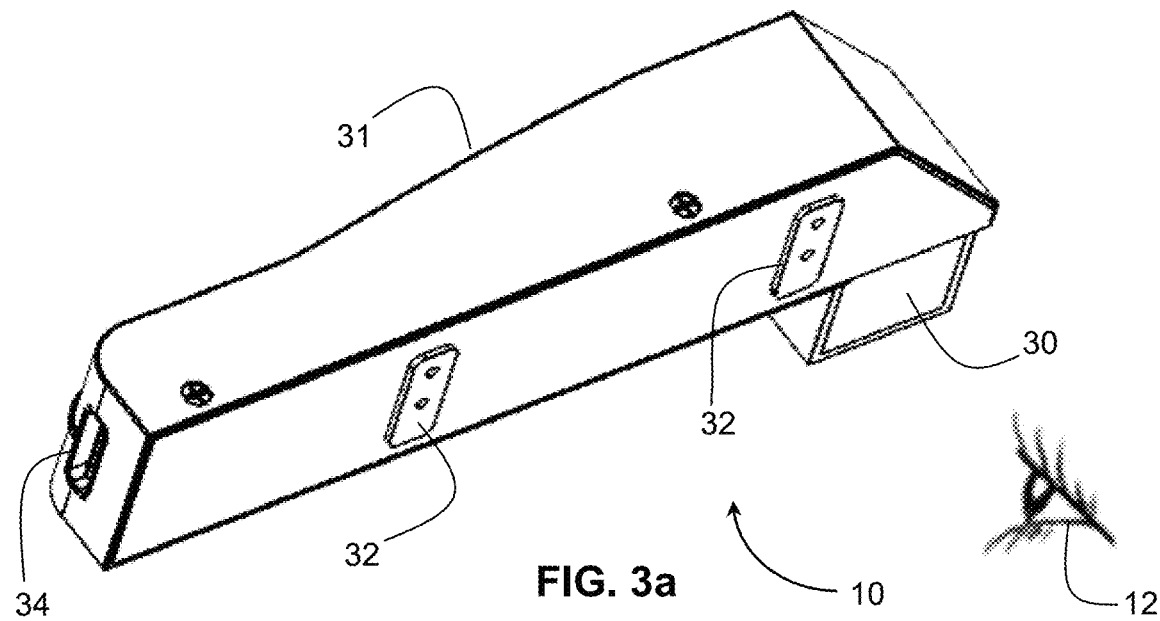
FIGS. 3a and 3b are pictorial representations of the detachable device when seen from the rear and front respectively.

FIG. 3*a* is a pictorial representation showing a rear view of the device 10. The user 12 sees the real scene through an exit window 30 and also sees a graphical annotation overlaid on this scene. These annotations may include marks, text, graphical shapes etc. The detachable device has a housing 31 to which there are fixed mounting brackets 32 for supporting a clip-on unit (not shown) such as described in WO 2019/215739 by means of which the device 10 is clipped on to the front of the user's eyeglasses. The device 10 may alternatively be attached magnetically to the user's spectacles or it may be any other kind of head-mounted device. Optionally, a USB connector 34 is provided for coupling the device 10 to the smartphone 19.

Figure 3B:
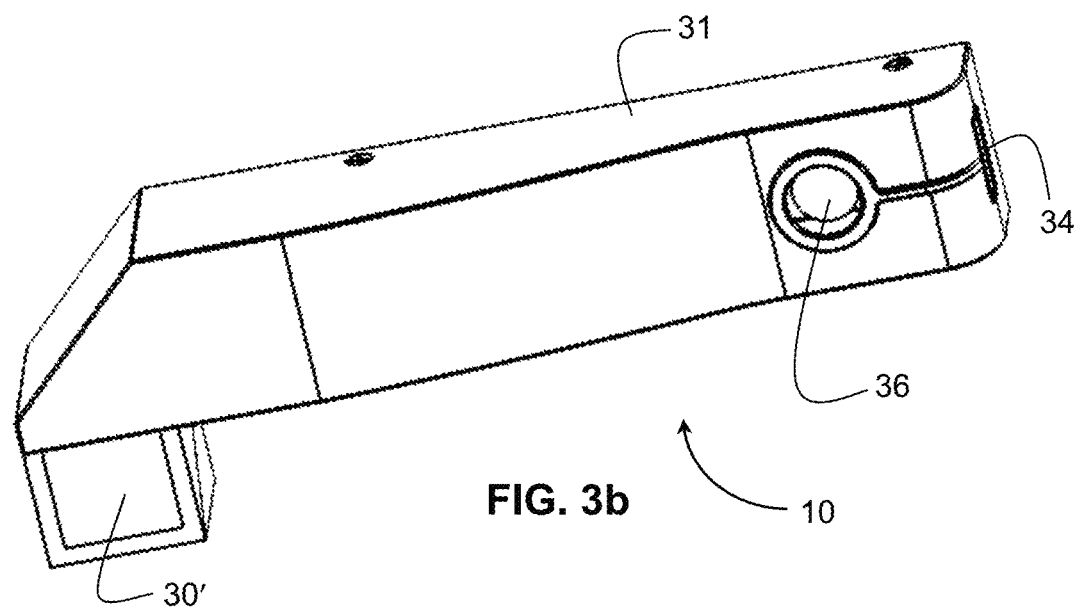

FIG. 3*b* shows a front view of the detachable device 10 as seen from the front, i.e. looking towards the user 12. In some embodiments, an optional window 36 is provided through which an optional built-in camera 37 located inside the device and shown schematically in dotted outline in FIG. 3*c* images the external scene. Also shown is an entrance window 30' through which light from scene passes to the exit window 30, to be observed by the user. The camera when provided can be used as a supplementary navigation aid as described in above-mentioned WO 2019/215739 and can also be used to calibrate the IMU in the same way as Google's Live View but with the advantage that the user does not need to hand-hold his or her smartphone.

Figure 3C:
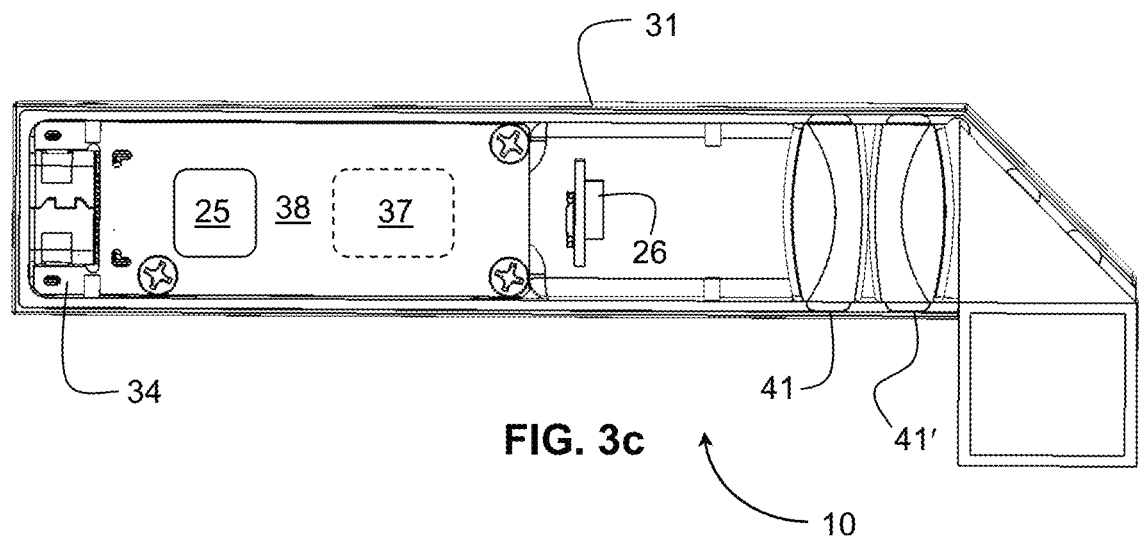
FIG. 3c is a partially cut-away view of the detachable device when seen from the rear showing partial details of the optics contained therein.
Figure 3D:
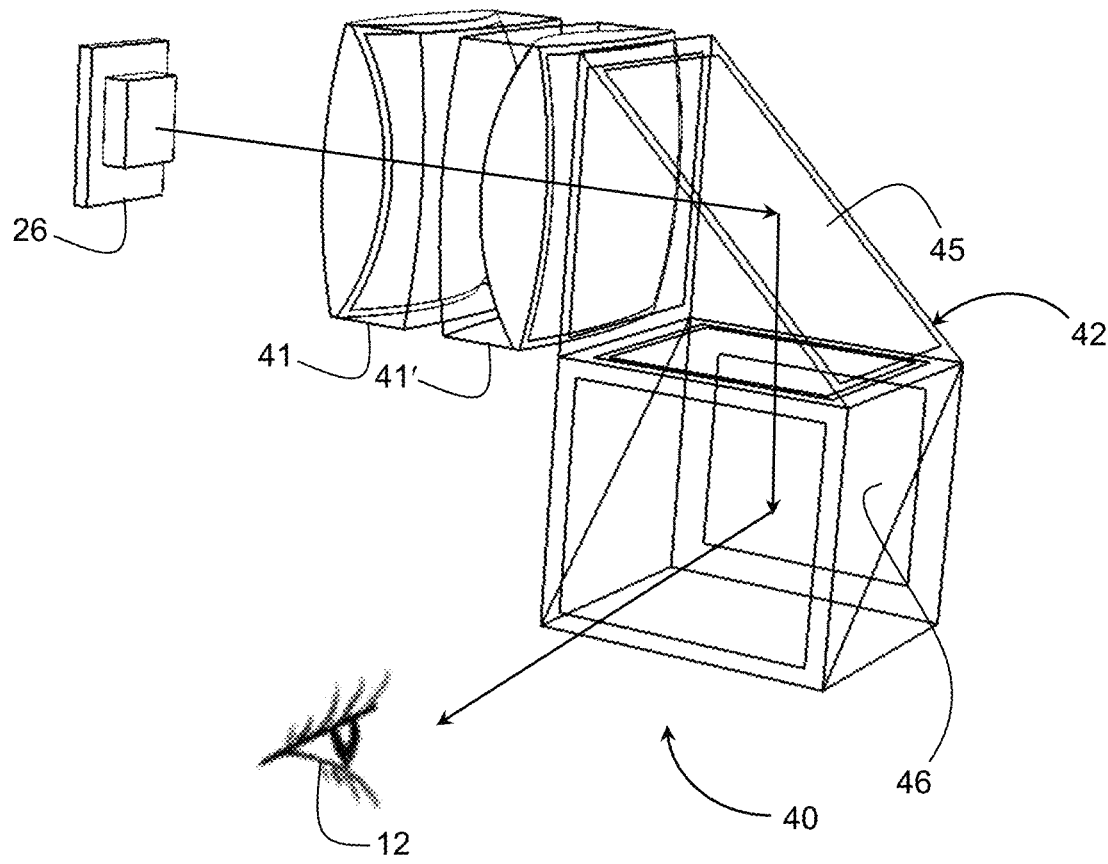
FIG. 3d is a schematic representation of the optics.

FIG. 3*c* shows in more detail the inner structure of the device 10. A printed circuit board (PCB) 38 supports an electronic circuit for the electronic operation of the detachable device. Also connected to the PCB 38 are the IMU 25, USB connector 34 (needed only if wired communication is used) a micro-display 26 and an optional built-in camera 37.

The micro-display 26 is a high-brightness monochrome display having the following main characteristics:
Number of pixels: 304×256
Pixel size: 12 μm×12 μm
Active area: 3.648 mm×3.972 mm The device 10 houses optics 40 shown in FIG. 3*d*, which includes two doublets 41, 41' and a combined prism 42. The doublets 41, 41' create a combined objective with equivalent focal length of 21 mm. The light emitting plane of the micro-display 26 is located at the focal plane of this combined objective so that an image of the display is created at infinity, whereby the user 12 sees the image on the display projected on the real scene. A typical image of the screen includes a cross-shaped marker or reticle, used by the user to designate an object in his field of view. The image is further folded, as illustrated by the arrows, first by a mirror surface 45 of the combined prism 42 and then is directed to the eye of the user 12 by a partial mirror surface 46, which allows light from the display 26 to reach the user's eye, and at the same time allows the user to see the real scene transmitted through the partial mirror surface 46 via the exit window 30 in FIG. 3*b*. Typically, the partial mirror surface 46 has a reflection of ~50% and transmission of ~50%. Since the focal length of the combined doublets is 21 mm, the display screen captures a Field of View of H: 10×V: 8.3 degrees (13 degrees diagonal). The optical design allows the user an eye motion box of 4.5 mm diameter.

Such an arrangement allows for a very compact device to be mounted on the user's spectacle frame in a manner that allows for lateral adjustment so that the exit window 30 is aligned with the user's eye thereby obviating the need for a large eye motion box, which would mandate use of more bulky optics. Many conventional see-through AR systems require a large field of view for displaying graphical annotations on reality. Such systems are heavy, cumbersome, and expensive. Furthermore, many use built-in cameras to image landmarks for allowing a navigation system to determine the user's location based on the landmark image. This further adds to the bulk of the AR device and adds significant overhead to the communications bandwidth.

In the device according to the invention, small field of view, with minimal AR annotation for markers and directions only and the lack of reliance on a camera enable a compact device. By combining this and voice, complex annotations (i.e. landmark's names, complex directions) are given verbally, enabling use of small field of view. This results in a compact AR, hands-free on-the-go pedestrian navigation.

Figure 4A:
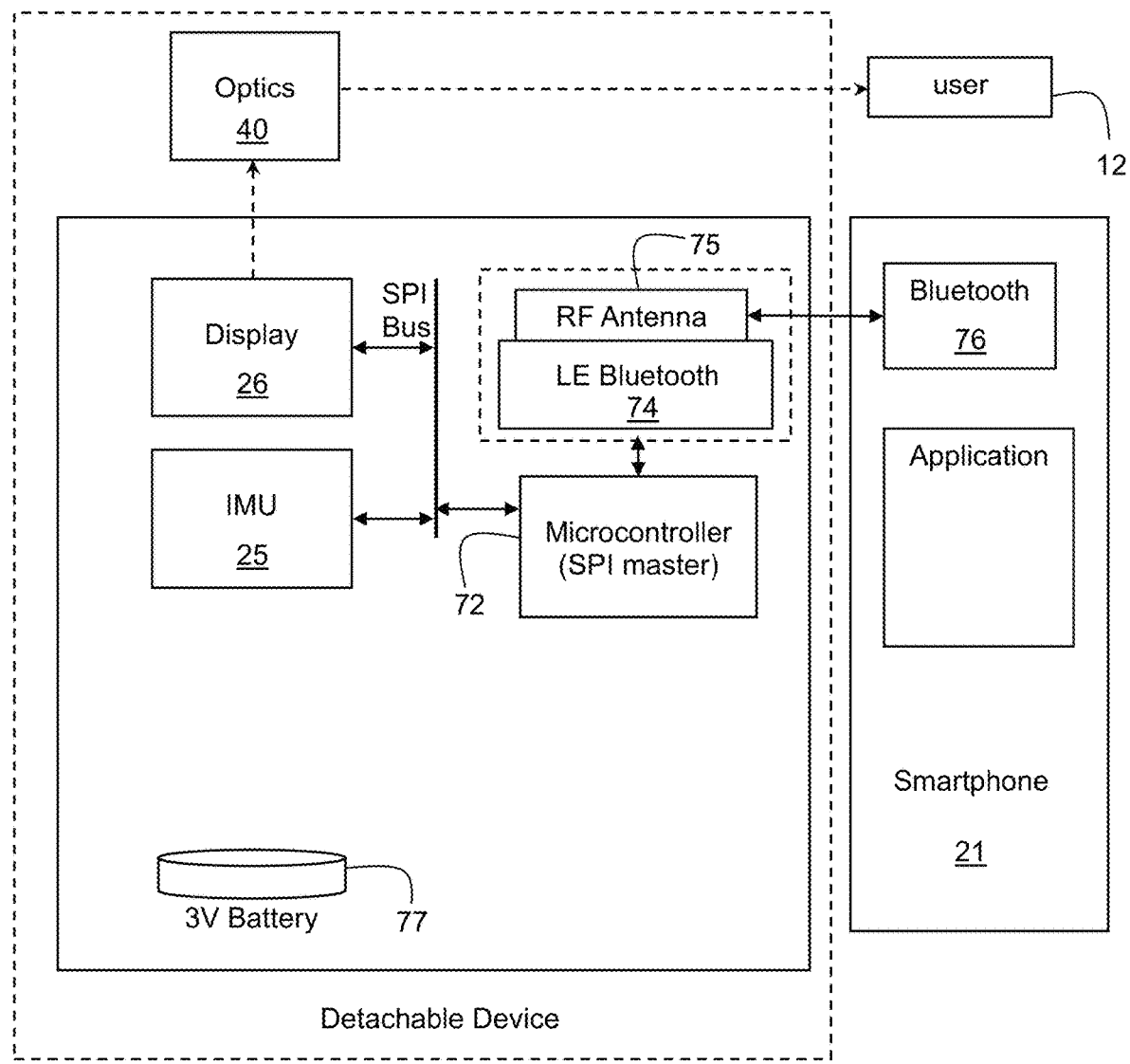
FIGS. 4a and 4b are block diagrams of the device in wireless and wired configurations, respectively.
Figure 4B:
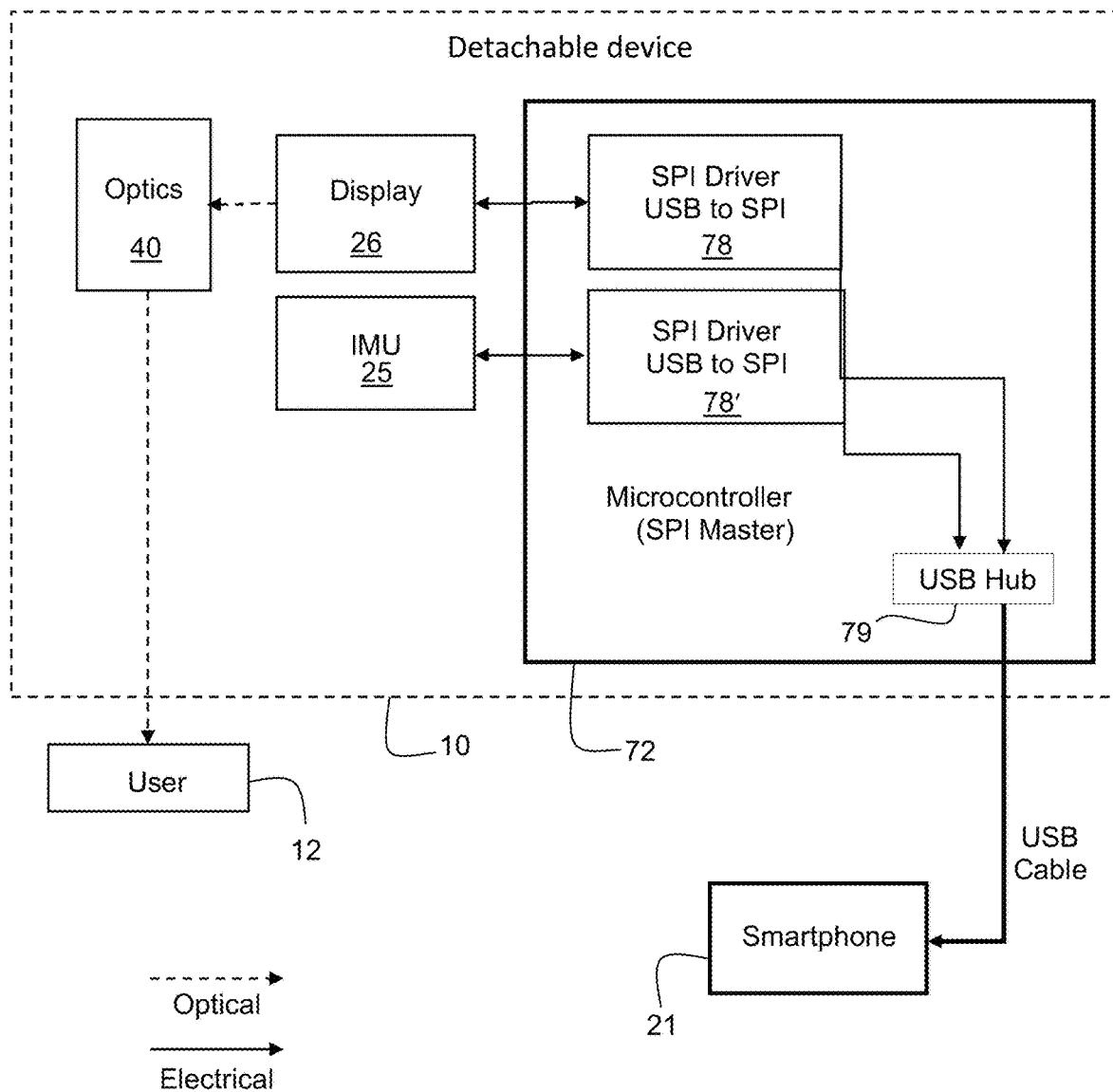

FIGS. 4*a* and 4*b* are block diagrams of the device 10, in wireless and wired configurations, respectively. Thus, as shown in FIG. 4*a*, optics 40 as described above project to the eye of the user 12 the micro-display 26 whose screen image is thus overlaid on the external scene. The device 10 accommodates the Inertial Magnetic Unit (IMU) 25 for tracking motion of the device and thereby head motion of the user. The micro-display 26 and the IMU 25 are connected to a microcontroller 72. The microcontroller 72 also processes the data for two-way communication with a Low Energy (LE) Bluetooth™ unit 74 via an RF antenna 75. The Bluetooth™ unit 74 communicates with a Bluetooth™ unit 76 in the smartphone 21. A built-in battery 77 provides power to the device components.

FIG. 4*b* shows an alternative embodiment using USB wired communication. The microcontroller 72 contains SPI (Serial Peripheral Interface) drivers and USB to SPI converters 78, 78' which connect the display 26 and the IMU 25, respectively to a USB hub 79. The USB hub 79 connects to the smartphone 21 via a USB cable.

Figure 5:
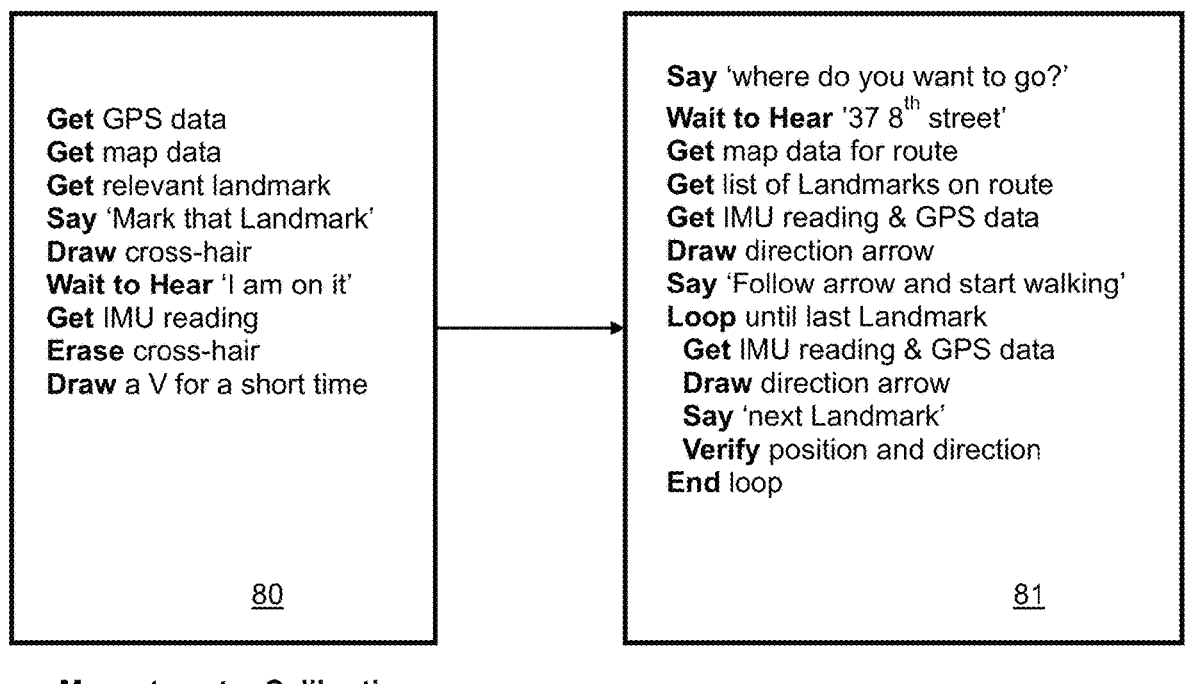
FIG. 5 shows the principal operations associated with methods for calibrating the IMU magnetometer and providing navigation instructions to the user.

FIG. 5 shows the principal operations associated with methods for calibrating the IMU magnetometer and providing navigation instructions to the user. For the sake of abundant clarity, the magnetometer is a component of the IMU 25 and is not shown discretely in the drawings. The user 12 first attaches the device 10 on to the spectacle frame 11 and switches it on. In a first step, the magnetometer calibration is performed in order to establish the orientation of the device 10 relative to Earth coordinates when the user is gazing at a known landmark.

This magnetometer calibration (80) is done as follows.

The smartphone control application 27 gets the GPS data from the smartphone GPS unit 22.

The smartphone control application determines 'area of sight' and based on GPS location and estimated observed area, it gets relevant landmarks from GPS/Map database, i.e. Google Maps. The map is stored in the navigation application cloud 29 from which the relevant portion of the map corresponding to the 'area of sight' is downloaded to the smartphone. The smartphone control application identifies a visible landmark in the vicinity of the user (e.g. a known Department Store), draws a marker on the display 26 of device 10 and tells the user to point his view towards this landmark until the marker is overlaid on this landmark. The user verbally confirms that his gaze is directed toward the landmark.

The smartphone control application reads the azimuth measured by the magnetometer, calculates the azimuth between the user location and the landmark location based on the map, and then calibrates the magnetometer, marks a "V" on the display, and the user may start navigating.

Although the landmark may be suggested by the smartphone application 27, it may also be suggested by the user. In this case the user may say "I see Starbucks coffee on my right", the system will recognize it, and the process will continue as before. This corresponds to the conventional use of Alexa, in which the user vocalizes a request. Alexa converts the speech to text and conveys it to the Alexa cloud where it is parsed and processed to derive a suitable response that is conveyed to the user as a text string, which is then converted locally to voice and vocalized.

Once the magnetometer is calibrated, the smartphone application 27 can indicate the computed direction of travel graphically by displaying on the micro-display 26 ancillary visual prompts such as an arrow whose direction points to magnetic north and/or textually such as North-North West. The display image is superimposed on the external scene by the optics 40. However, in a simplified device having no see-through display the IMU can be head-mounted without projection of any marker or with projection of a marker using a non-see-through display such as Google Glass. Alignment with a named landmark is simply confirmed verbally and the user's orientation is determined based on the IMU measurements conveyed to smartphone application 27. This is likely to be less accurate but still permits the user to gaze toward a landmark that allows the smartphone application 27 to orientate the user and provide comprehensive navigation instructions. Also, although verbal commands are preferred, the invention contemplates use of a pushbutton micro-switch on the clip-on device 10 and which may be pressed by the user to confirm to the smartphone application when his or her gaze is directed to the landmark.

While, of course, this is not a completely hands-free operation it still does not require manual interaction with the smartphone. Moreover, since calibration is executed only when initializing the navigation application and during verification, such a variation may still, to all intents and purposes, be regarded as a vocal navigation system.

Once calibration is done, navigation (81) may commence.

The user tells the system where he wants to go.

The smartphone application calculates the route and compiles landmarks along the route, obtains the IMU and GPS data, and once ready, displays on the display 26 graphical navigation aids such as an arrow showing the direction the user should head, and/or conveys verbal instructions to assist in navigation.

During the navigation, the smartphone application provides the user with verbal instructions and graphic annotations.

During the navigation, either the user or the smartphone application may initiate a verification mode to ensure that the user is still on track.

Figure 6:
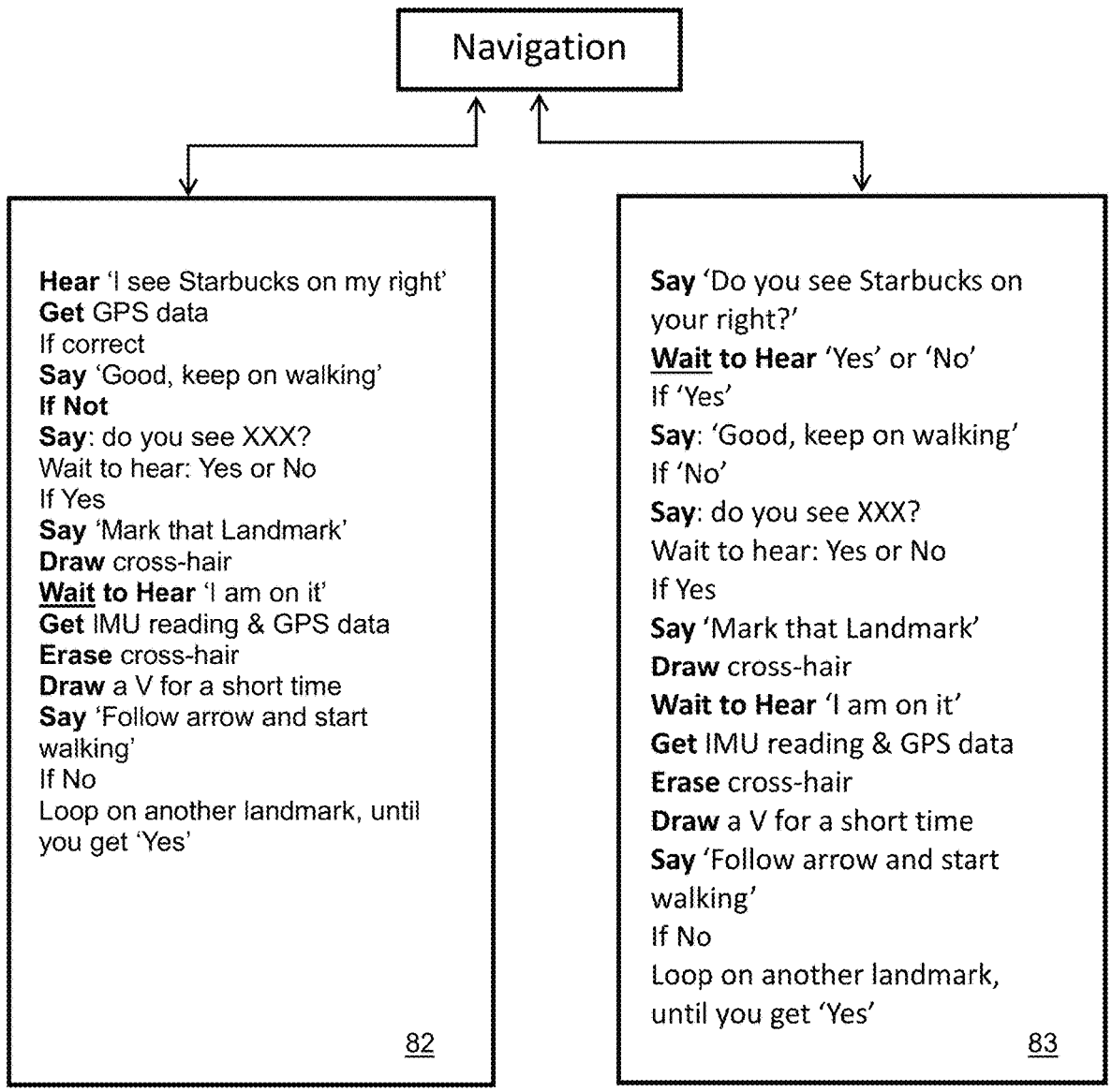
FIG. 6 shows the principal operations associated with methods for verifying that the user is following the correct route.

FIG. 6 shows the principal operations associated with methods for verifying that the user is following the correct route. As shown, verification can be initiated by the user as shown in (82), for example when in doubt or by the smartphone application as shown in (83). When user-initiated, the user vocally identifies a landmark that he is passing, e.g. "I see Starbucks on my right". The smartphone application checks if this is correct, and if so responds by "Great, keep on walking". Otherwise, the smartphone application will direct the user to a nearby landmark and will direct him to perform a calibration routine, similar to that shown in FIG. 5 as 80 and then, if necessary, will update the navigation instructions.

Smartphone verification (83) operates in a similar manner to initial calibration except that the smartphone vocally prompts the user to confirm that a landmark that should be in view is correctly seen by the user. Regardless of whether verification is initiated by the user of by the smartphone application, the landmark may be selected by either the user or by the smartphone application. For example, the user can simply say: "Help" and the smartphone application will carry out the verification protocol (83).

As noted above, an aspect of the invention can be implemented without a display but only with a smart glass frame or earphone containing an IMU, a microphone and earphones.

In this case the user points his head to the coarse direction of a landmark when a calibration or verification is needed. Although the orientation determined this way is less accurate than that achieved using a projected marker, it is still more accurate than that available by present magnetometers. Nevertheless, it is clear that in this case graphical annotations are not possible and only verbal directions are available.

Figure 7:
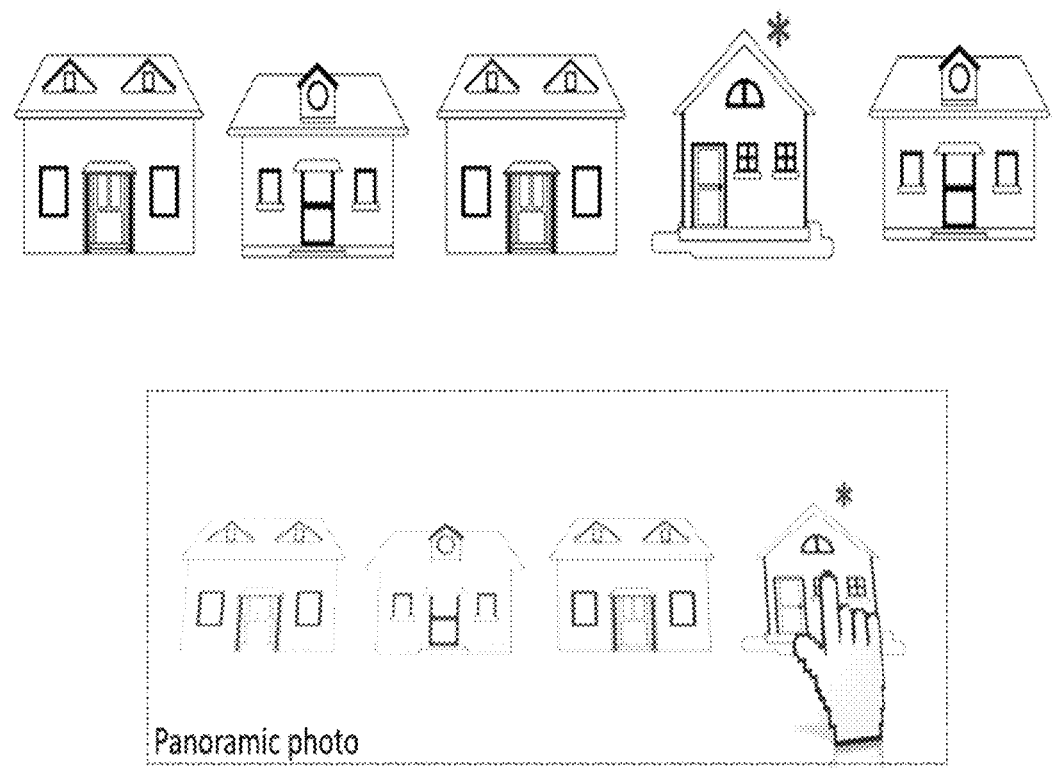
FIG. 7 shows pictorially an alternative embodiment for calibrating the magnetometer when no discernible landmarks can be identified.

FIG. 7 shows pictorially an alternative embodiment for calibrating the IMU when no discernible landmarks can be identified. This can happen in a situation in which the elements surrounding the user lack any special attributes, e.g. when the buildings lack any signs, so that neither the user nor the system can verbally describe any object around the user. In such cases, the smartphone application, based on the user's GPS position, will provide him with a panoramic photo of his Area of Sight to his phone. Such photo can be retrieved from the Street View cloud database or similar. The user locates the object he is looking at in the displayed panoramic photo and clicks on it. Based on the selected area in the panoramic photo, the smartphone application will be able to correlate the selected image to a real object the user is looking at and identify it thereby establishing the user's direction of gaze.

It will be appreciated that modifications can be made without departing from the scope of the invention as claimed. For example, the microphone and the earphone need not be integrated into the spectacle frame. The microphone may be clipped on to the user's jacket and coupled to the smartphone as may be the earphone. In such case, either or both may be wirelessly coupled to the smartphone, typically using the smartphone Bluetooth™ interface or may be connected via suitable cables.

It should also be noted that while embodiments have been described with particular reference to the calibration of an IMU employing a magnetometer, as noted above IMUs may employ gyroscopes that provide a relative angular displacement. In such case, calibration of the IMU determines an initial azimuth of the pedestrian relative to a known landmark, and the gyroscope indicates relative rotation of the IMU and hence the user relative to the initial azimuth.

The invention can be implemented using a display that is not see-through but which provides visual navigation signals. For example, LEDs having different colors or geometrical forms may be mounted in spatial association with the head-mountable device so that the user sees them when looking toward in the distance. An illuminated LED will be visible to the user, albeit not in sharp focus, and may indicate direction. The user may direct his or her gaze via a specific one of these LEDS or may point his head to the coarse direction of a landmark when a calibration or verification is needed as described previously. The LEDs can be built into or mounted in front of a spectacle lens.

It should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

It will also be understood that the software according to the invention may be implemented by a computer program being readable by a computer processor for executing the method of the invention. The invention further contemplates a machine-readable memory tangibly embodying a program of instructions executable by the machine for executing the method of the invention.

The invention claimed is:

1. A hands-free pedestrian navigation method for assisting a user to reach a destination, the method comprising:
   (a) mounting on the user's head (i) a display for projecting a visual image in front of the user's gaze, and (ii) an IMU;
   (b) obtaining from a GPS unit carried by the user an approximate user location;
   (c) using the approximate user location to locate the user in a computerized map of an area containing the user;
   (d) determining in said area a landmark having a known landmark location within view of the user;
   (e) projecting via the display a marker on to a field of view of the user and obtaining confirmation from the user that the user's gaze is directed to the landmark when the marker is aligned with the landmark and obtaining a first azimuth measured by a magnetometer or a gyroscope element of said IMU;
   (f) determining a computed second azimuth between the approximate user location and the landmark location extracted from the computerized map;
   (g) calibrating the magnetometer or the gyroscope element of said IMU using said computed second azimuth as opposed to said azimuth measured by said magnetometer or said gyroscope element of said IMU; and
   (h) navigating the user by providing vocal prompts and projecting ancillary visual prompts via the display.

2. The method according to claim 1, further including:
   (a) obtaining a measured first azimuth from a head-mounted magnetometer in the IMU when the user's gaze is directed to the landmark; and
   (b) orienting the user by computing an offset between the measured first azimuth and the computed second azimuth.

3. The method according to claim 1, wherein at least one of the following is conveyed vocally: (i) the confirmation from the user that the user's gaze is directed to the landmark; (ii) identification of the landmark; and (iii) identification of the destination.

4. The method according to claim 1, wherein the landmark is identified by displaying a panoramic photo of an area of sight on a smartphone carried by the user and identifying an object in said panoramic photo selected by the user.

5. The method according to claim 1, including verifying that the user is following a correct route by displaying visual indications in his field of view via the display and optionally alerting the user that he is deviating from a correct route by displaying visual indications in his field of view via the display.

6. The method according to claim 1, wherein the user conveys information vocally via a software application having an interface to a third-party virtual assistant coupled to a navigation server.

7. The method according to claim 6, wherein the third-party virtual assistant is a cloud application and is coupled to the navigation server over the Internet.

8. A computer program product comprising a computer-readable memory storing program code instructions, which when executed by a computer processing unit carries out the method according to claim 1.

9. A pedestrian navigation system for directing the user to a destination, the system comprising:
   a GPS unit carried by a user,
   a head-mountable device for wearing by the user and including an IMU and a display for projecting a visual image in front of the user's gaze, and
   a portable computing device carried by the user operatively coupled to the GPS unit and the head-mountable device and having a memory and a processing unit programmed to:
   (a) obtain from a GPS unit carried by the user an approximate user location;
   (b) use the approximate user location to locate the user in a computerized map of an area containing the user;
   (c) determine in said area a landmark having a known landmark location within view of the user;
   (d) project via the display a marker on to a field of view of the user and obtain vocal confirmation from the user that the user's gaze is directed to the landmark when the marker is aligned with the landmark and obtain a first azimuth measured by a magnetometer or a gyroscope element of said IMU;
   (e) determine a computed second azimuth between the approximate user location and the landmark location extracted from the computerized map;

(f) calibrate the magnetometer or the gyroscope element of said IMU using said computed second azimuth as opposed to said first azimuth measured by said magnetometer or said gyroscope element of said IMU; and (g) navigate the user by providing vocal prompts and project ancillary visual prompts via the display.

10. The system according to claim 9, further including:

(h) obtaining a measured first azimuth from a magnetometer in the head-mounted device when the user's gaze is directed to the landmark; and (i) orienting the pedestrian by computing an offset between the measured first azimuth and the computed second azimuth.

11. The system according to claim 9, further including a remote navigation server storing map data in communication with the portable computing device for conveying the computerized map to the portable computing device.

12. The system according to claim 9, wherein the portable computing device is a smartphone that includes the GPS unit built-in.

13. The system according to claim 9, wherein the head-mountable device is detachably mounted on a spectacle frame and the display contains a micro-display for displaying an image and optics for projecting the image on to a scene viewed by the user and optionally a microphone and earphone are built-in the spectacle frame and are configured for coupling to the portable computing device for conveying vocal information thereto and for conveying vocal instructions for directing the user to a required destination.

14. The system according to claim 13, wherein the image is a marker that is projected on to the landmark when the user's gaze is aligned with the landmark.

15. The system according to claim 13, wherein the processing unit is programmed to convey a navigation aid to the micro-display.

16. The system according to claim 9, further including a microphone and earphone coupled to the portable computing device for conveying vocal information thereto and for conveying vocal instructions for directing the user to a required destination.

17. The system according to claim 13, wherein:

the portable computing device executes a software application having an interface to a third-party virtual assistant coupled to a navigation server, and optionally the microphone and earphone connect via Bluetooth to a host application in the portable computing device, and the host application is configured to communicate over the Internet with a cloud application.

18. The system according to claim 17, wherein:

the portable computing device executes a software application having an interface to a third-party virtual assistant coupled to the navigation server, the spectacle frame connects via Bluetooth to a host application in the portable computing device, and the host application is configured to communicate over the Internet with a cloud application.

19. The system according to claim 17, wherein:

the host smartphone application is configured to perform voice/text conversion and interfaces to a navigation application cloud over the Internet.

20. The system according to claim 9, wherein the display is a see-through display.

* * * * *